United States Patent [19]
Rogers

[11] 3,964,325
[45] June 22, 1976

[54] POWER TRANSMISSION DEVICE

[76] Inventor: Robert Rogers, 6 East Lane, Hughestown, Pa. 18640

[22] Filed: Mar. 17, 1975

[21] Appl. No.: 559,242

[52] U.S. Cl. .............................................. 74/219
[51] Int. Cl.² ........................................ F16H 7/00
[58] Field of Search ....................... 74/219, 217 C

[56] References Cited
UNITED STATES PATENTS

| | | | |
|---|---|---|---|
| 559,299 | 4/1896 | Matthern | 74/219 X |
| 789,580 | 5/1905 | Trainor | 74/219 X |
| 1,154,292 | 9/1915 | Cribbs | 74/219 X |
| 1,360,032 | 11/1920 | Schiffner | 74/219 X |
| 1,478,778 | 12/1923 | Werry | 74/219 |
| 1,535,714 | 4/1925 | Burke | 74/219 X |
| 2,200,175 | 5/1940 | Kaestner | 74/219 X |

FOREIGN PATENTS OR APPLICATIONS

| | | | |
|---|---|---|---|
| 823,966 | 1/1938 | France | 74/219 |

*Primary Examiner*—Leonard H. Gerin

[57] ABSTRACT

This device consists primarily of a shaft mounted between the front and rear sprockets of a motorcycle, the shaft having a pair of spaced apart sprockets of dissimilar size secured thereto so as to provide through a pair of chains, greater torque on the drive wheel of the motorcycle.

1 Claim, 4 Drawing Figures

POWER TRANSMISSION DEVICE

This invention relates to drive mechanisms, more particularly to a power transmission device.

It is therefore the principal object of this invention to provide a power transmission device which will obtain more torque and speed than drives of the prior art.

Another object of this invention is to provide a power transmission device which will include a shaft mounted centrally between the front and rear sprockets of the machine, the shafts having secured fixedly thereto, a pair of spaced apart sprockets one being larger than the other, the larger srocket engaging the front sprocket of the machine by an endless chain and the smaller sprocket on the central shaft will have endless chain means engaging the rear sprocket so as to provide greater torque and speed for the drive wheel of the machine.

A further object of this invention is to provide a power transmission device of the type described, which will be of such structure, so as to deliver more power while having a smaller sprocket on the rear wheel which will impart greater speed to the machine without losing torque on the rear wheel.

A still further object of this invention is to provide a power transmission device of the type described, which may be adapted as gear train means for automotive vehicles and one of the middle sprockets may be a very large one for use in hill climbing while the other middle sprocket may be much smaller, the sprockets mounted in the middle between the front and rear sprockets, causing a balance of power.

Other objects of the invention are to provide a power transmission device which is simple in design, inexpensive to manufacture, rugged in construction, easy to use and efficient in operation.

These and other objects will be readily evident upon a study of the following specification and the accompanying drawing, wherein.

Figure 1:
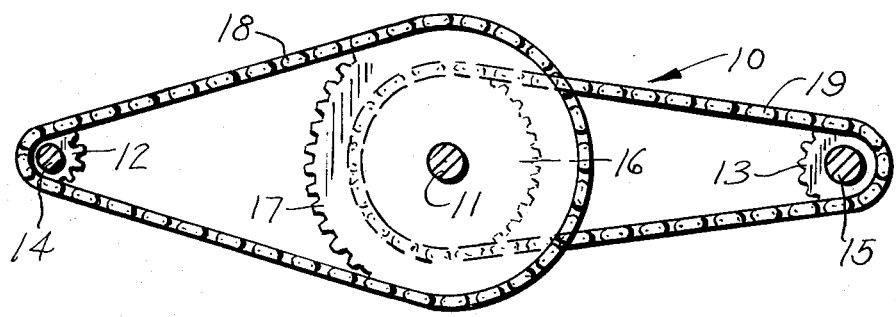
FIG. 1 is a side view of the present invention showing in elevation.

According to this invention, a power transmission device 10 is shown to include a centrally mounted shaft 11 which will be secured to the motorcycle frame in a suitable manner. Shaft 11 is centrally mounted between the front sprocket 12 and the rear sprocket 13, the rear sprocket 13 providing the drive means for the wheel of the machine. Front sprocket 12 and rear sprocket 13 are secured fixedly to their respective shafts 14 and 15. A pair of spaced apart sprockets 16 and 17 are fixedly secured to the centrally mounted shaft 11 and the larger sprocket 17 engages with endless chain 18 which engages the front sprocket 12. The smaller sprocket 16 of the combination, engages with endless chain 19 which engages and drives the rear sprocket 13, the combination providing maximum support at the shaft 15 without a loss of speed.

Figure 2:
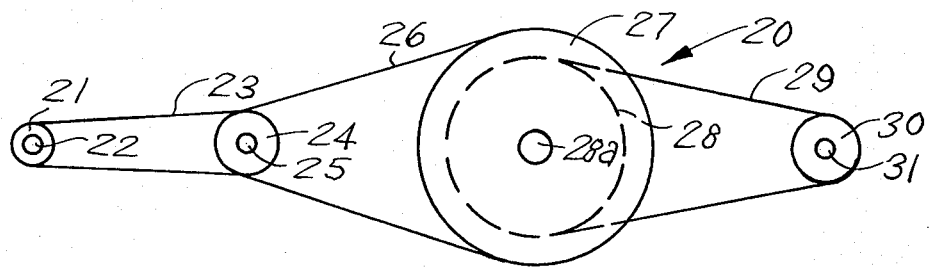
FIG. 2 is a diagrammatic side view showing a modified form of the invention.

Referring now to FIG. 2 of the drawing, a device 20 is shown to include a front sprocket 21 secured fixedly to shaft 22. Sprocket 21 is engaged with endless chain 23 which simultaneously engages with sprocket 24 secured fixedly to shaft 25 spaced apart from front sprocket 21. Sprocket 24 is a double sprocket and on the other side, carries endless chain 26 which is simultaneously carried upon a large sprocket 27 which is spaced apart from a smaller sprocket 28, both being carried fixedly upon shaft 28A. Sprocket 28 engages with endless chain 29 which is simultaneously carried on rear sprocket 30 which is fixedly secured to shaft 31. The aforementioned combination serves to deliver maximum torque and speed similar to that described in the main embodiment of the present invention.

Figure 3:
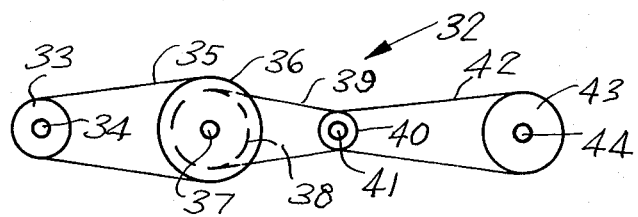
FIG. 3 is a diagrammatic side view showing another modified form of the invention.

Looking now at FIG. 3 of the drawing, one will see a modified device 32 having a front sprocket 33 secured fixedly to shaft 34. Sprocket 33 carries an endless chain 35 which engages sprocket 36 secured fixedly to shaft 37 and sprocket 36 is spaced apart from a smaller sprocket 38 which carries endless chain 39 which simultaneously engages sprocket 40 secured fixedly to shaft 41. Sprocket 40 is a double sprocket and on the opposite side, carries endless chain 42 which engages rear sprocket 43 secured fixedly to shaft 44. This above mentioned combination serves to function in a similar manner as those here for described.

Figure 4:
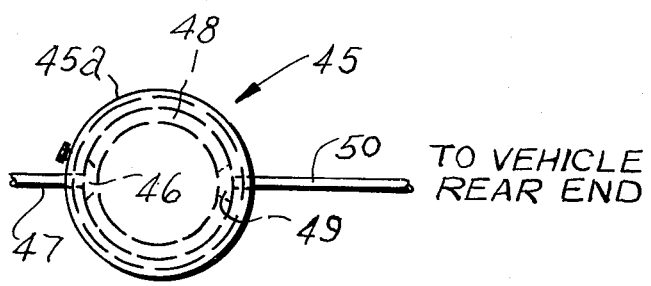
FIG. 4 is a face view of still another modified form of the invention shown in elevation.

Looking now at FIG. 4 of the drawing, one will see a modified form of device 45 having a gear 46 on the interior of the housing 45A, which is secured to drive shaft 47. Gear 46 toothingly engages ring gear 48 on the interior of housing 45A. Oppositely opposed to gear 46 is a gear 49 within housing 45A, the gear 49 engaging ring gear 48 in an oppositely opposed manner, the gear 49 being secured fixedly to shaft 50 which extends through the vehicles rear end. The device 45 also provides a similar function to those devices heretofore described.

What I claim is:

1. A power transmission device, comprising in combination, a central shaft having a large sprocket and a small sprocket mounted fixedly thereupon in axially spaced apart relation, an endless chain around said large sprocket and around a front sprocket affixed on a front shaft, an endless chain around said small sprocket and around a new rear double sprocket affixed on a rear shaft, said central shaft being located between said front and rear shafts, said rear double sprocket also having a second endless chain therearound and around a second sprocket affixed on a second rear shaft spaced from the first said rear shaft, and the first said rear shaft being secured to a drive wheel of a vehicle.

* * * * *